(12) United States Patent
Egli

(10) Patent No.: US 7,546,576 B2
(45) Date of Patent: Jun. 9, 2009

(54) SOFTWARE FRAMEWORK FOR WEB-BASED APPLICATIONS

(75) Inventor: Paul Egli, Scotts Valley, CA (US)

(73) Assignee: Lightsurf Technology, Inc., Santa Cruz, CA (US)

( * ) Notice: Subject to any disclaimer, the term of this patent is extended or adjusted under 35 U.S.C. 154(b) by 536 days.

(21) Appl. No.: 09/882,525

(22) Filed: Jun. 15, 2001

(65) Prior Publication Data
US 2003/0084120 A1 May 1, 2003

(51) Int. Cl.
G06F 9/44 (2006.01)
G06F 17/00 (2006.01)

(52) U.S. Cl. .................. 717/106; 717/114; 717/116; 717/118; 715/239

(58) Field of Classification Search ......... 717/105–119; 707/513, 102, 530, 500, 103 Y, 3; 715/513, 715/239; 709/204, 246, 229; 713/200
See application file for complete search history.

(56) References Cited

U.S. PATENT DOCUMENTS

| | | | |
|---|---|---|---|
| 5,870,550 A * | 2/1999 | Wesinger et al. ............ 709/218 |
| 6,125,363 A | 9/2000 | Buzzo et al. ................ 707/100 |
| 6,128,611 A * | 10/2000 | Doan et al. ..................... 707/4 |
| 6,195,533 B1 | 2/2001 | Tkatch et al. .............. 340/7.29 |
| 6,266,666 B1 | 7/2001 | Ireland et al. ................ 707/10 |
| 6,393,437 B1 * | 5/2002 | Zinda et al. ................ 707/201 |
| 6,418,448 B1 | 7/2002 | Sarkar ................... 707/104.01 |
| 6,504,554 B1 | 1/2003 | Stone et al. ................. 345/760 |
| 6,536,037 B1 | 3/2003 | Guheen et al. ............. 717/151 |
| 6,605,120 B1 * | 8/2003 | Fields et al. ................ 715/239 |
| 6,675,354 B1 * | 1/2004 | Claussen et al. ............ 715/513 |
| 6,697,824 B1 * | 2/2004 | Bowman-Amuah ......... 709/229 |
| 6,718,516 B1 | 4/2004 | Claussen et al. |
| 6,721,747 B2 * | 4/2004 | Lipkin ......................... 707/10 |
| 6,732,330 B1 | 5/2004 | Claussen et al. |
| 6,760,748 B1 * | 7/2004 | Hakim ....................... 709/204 |

(Continued)

FOREIGN PATENT DOCUMENTS

EP 1139216 A2 * 10/2001

(Continued)

OTHER PUBLICATIONS

Baker, Using server side XML to create individualized Web pages, Sep. 23-25, 1998, IEEE, pp. 317-319 vol. 2.*

(Continued)

*Primary Examiner*—Wei Y Zhen
*Assistant Examiner*—Satish Rampuria
(74) *Attorney, Agent, or Firm*—Blakely, Sokoloff, Taylor & Zafman, LLP; Judith A. Szepesi

(57) ABSTRACT

A Web application framework for creating Web-based applications is described. The framework includes an abstract command tag that predefines at least some generic Web application activities. When using the framework, one specifies at least one custom action that is desired to be performed by a Web application under development. In one embodiment, this includes creating a customized command tag that is capable of being embedded within a Web page. The customized command tag includes the ability to conditionally execute the specified custom action based on run-time conditions. The customized command tag is embedded in a Web page of the Web application.

45 Claims, 6 Drawing Sheets

U.S. PATENT DOCUMENTS

| | | |
|---|---|---|
| 6,799,184 B2 * | 9/2004 | Bhatt et al. .................. 707/102 |
| 6,925,631 B2 * | 8/2005 | Golden ....................... 717/115 |
| 6,952,800 B1 * | 10/2005 | Danner et al. ............... 715/234 |
| 6,981,211 B1 | 12/2005 | Claussen et al. |
| 6,981,212 B1 | 12/2005 | Claussen et al. |
| 7,165,243 B1 | 1/2007 | Pelegri-Llopart et al. |
| 7,200,681 B1 * | 4/2007 | Lewin et al. ................ 709/246 |
| 2002/0026447 A1 * | 2/2002 | Matsutsuka et al. ...... 707/103 Y |
| 2002/0049749 A1 * | 4/2002 | Helgeson et al. ................ 707/3 |
| 2002/0049788 A1 * | 4/2002 | Lipkin et al. ................ 707/513 |
| 2002/0073080 A1 * | 6/2002 | Lipkin ........................... 707/3 |
| 2002/0073236 A1 * | 6/2002 | Helgeson et al. ............ 709/246 |
| 2002/0078103 A1 * | 6/2002 | Gorman et al. ............. 707/530 |
| 2002/0120859 A1 * | 8/2002 | Lipkin et al. ................ 713/200 |
| 2002/0129054 A1 * | 9/2002 | Ferguson et al. ............ 707/503 |
| 2002/0129060 A1 * | 9/2002 | Rollins et al. ............... 707/513 |
| 2003/0018661 A1 * | 1/2003 | Darugar ...................... 707/500 |
| 2003/0093717 A1 * | 5/2003 | Mason ......................... 714/38 |
| 2004/0015832 A1 * | 1/2004 | Stapp et al. ................. 717/106 |
| 2004/0205550 A1 * | 10/2004 | Gerken ....................... 715/513 |
| 2005/0076291 A1 * | 4/2005 | Yee et al. .................... 715/513 |
| 2005/0216885 A1 * | 9/2005 | Ireland ....................... 717/108 |
| 2006/0101453 A1 * | 5/2006 | Burkhart et al. ............. 717/168 |

FOREIGN PATENT DOCUMENTS

| | | | |
|---|---|---|---|
| JP | 2002366352 A | * | 12/2002 |
| JP | 2003303101 A | * | 10/2003 |
| JP | 2003316575 A | * | 11/2003 |

OTHER PUBLICATIONS

Roy et al., XML: data's universal language, May-Jun. 2000, IT Professional, pp. 32-36 vol. 2, issue 3.*

Khare et al., XML: a door to automated Web applications, Jul.-Aug. 1997, Internet Computing, IEEE, pp. 78-87.*

Eun Sook Cho; Soo Dong Kim; Sung Yul Rhew; Sang Duck Lee; Chang Gap Kim; Object-oriented Web application architectures and development strategies; IEEE, Dec. 2-5, 1997, pp. 322-331.*

Tam, V.; Foo, W.K.; Gupta, R.K.; A fast and flexible framework of scripting for Web application development: a preliminary experience report; IEEE, vol. 1, 2000, pp. 450-455.*

Chien-Hung Liu; Kung, D.C.; Pei Hsia; Object-based data flow testing of web applications; IEEE, 2000, pp. 7-16.*

* cited by examiner

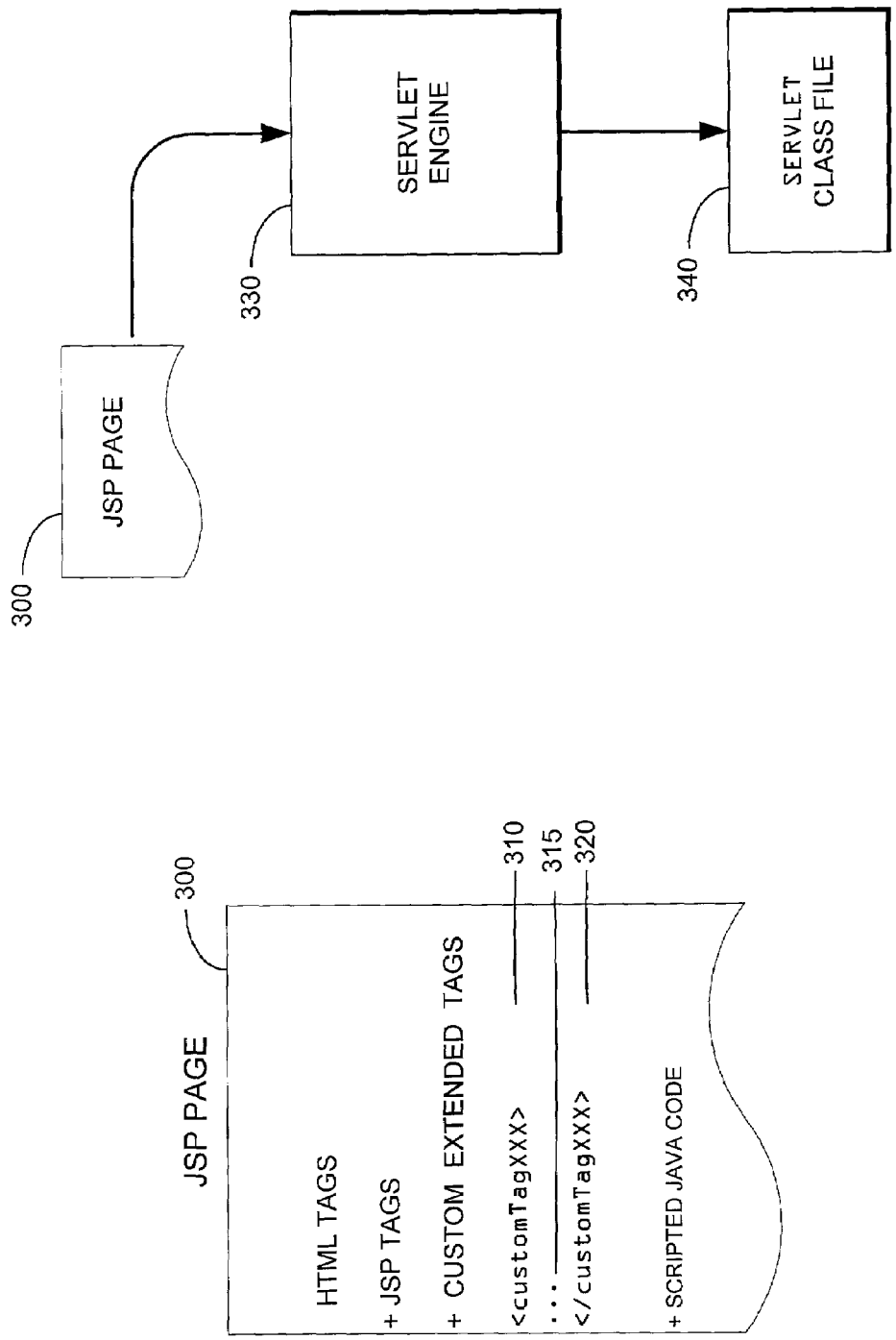

SOFTWARE FRAMEWORK FOR WEB-BASED APPLICATIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to software development, and more particularly to information systems for the development of Web-based applications.

2. Description of the Background Art

The growth of the Internet and the World Wide Web has led to the development of many platforms for creating dynamically-generated content accessible through thin clients such as Web browsers. These dynamic pages approach the capabilities of traditional desktop applications, and as such are often referred to as "Web applications." Early Web applications were developed with relatively low-level tools and APIs (application programming interfaces), such as the Common Gateway Interface (CGI) available from the University of Illinois, Urbana-Champaign. More recently, newer development environments and APIs have become available, including Cold Fusion (CFML) available from Allaire Corp., Active Server Pages (ASP) available from Microsoft Corporation, and JavaServer Pages (JSP) available from Sun Microsystems. Because of their improvements over CGI, these newer development environments and accompanying APIs have gained wide popularity and industry support.

Each of these modern development environments provides a wide array of tools and API calls to support development of dynamic Web sites, including the ability to build and reuse software libraries that fill specific business roles. For example, Web pages written in the ASP language can call reusable software objects that adhere to Microsoft Corporation's Component Object Model (COM). Web pages written with JSP, on the other hand, can call objects which conform to Sun Microsystems' JavaBeans 1.2 specification, including creating objects which are represented in a Web page by markup tags.

JSP is perhaps the most currently widespread technology in use for developing dynamically-generated Web pages in Web-based applications. The design intent of JSP is to provide a relatively simple scripting language, which by allowing the interweaving of brief Java code, HTML tags, and JSP tags, affords relatively quick creation of dynamically-generating Web pages. Here, the Java code implements the "business" logic (i.e., the dynamic generation of data output depending upon both the user input and the persistent metadata on the server side). The HTML tags, on the other hand, implement the display and interactive UI. The JSP tags themselves demarcate the two. Here, JSP allows page designers to separate business logic from display logic (i.e., UI) by dividing the coding between two disparate types of developers—that is, between HTML (Web) page designers and Java programmers.

Despite the advances made by these newer development environments, all have significant shortcomings. For instance, JSP has not been the Web application silver bullet that has been hoped for. As developers use this environment to devise even more demanding Web services, the complexities of JSP become problematic. Businesses that have purchased JSP-based software still depend upon consultants to install, implement, and deploy their live custom Web applications, which takes several months at best. Additionally, JSP adopts a programming approach that is multi-lingual in nature. Unfortunately, this has encouraged a style of programming that encourages development of hard-to-manage "spaghetti" code.

All told, present-day development environments fail to provide general-purpose code libraries to aid in the development of application-like Web sites and domain-specific, or "vertical," Web applications. At the same time, given the ever-increasing popularity of the Web as a platform for commerce and media services, there is great interest in addressing that deficiency.

SUMMARY OF THE INVENTION

The present invention includes a development environment providing a general-purpose Web application framework that addresses the previously-described complexity and programmatic requirements for building Web applications. More particularly, a general-purpose Web application framework is provided that defines a set of markup tags and a corresponding set of software objects, to aid in the development of Web application software.

In the currently-preferred embodiment, the power and utility of the framework are applied to rapidly build Web applications related to on-line (e.g., Web-based) media organization and sharing, for example, for building sophisticated Web-based applications allowing users to capture, arrange, and share digital media such as digital photographs, digital audio files, digital video files, digital documents, or the like. The impetus behind this embodiment is the ever-increasing consumer demand for on-line digital media management. This demand has grown with the increased sales of media-input devices, particularly digital cameras and digital audio recorders. Photo sharing, in particular, appears to be one of the most requested services on the Internet today. Accordingly, the currently-preferred embodiment of the present invention focuses on easing the development and time-to-market of on-line media management applications.

The framework includes an abstract command tag that predefines at least some generic Web application activities. When using the framework, one specifies at least one custom action that is desired to be performed by a Web application under development. This includes creating a Java class that extends the abstract command tag for providing execution logic for the (at least one) custom action, in addition to pre-existing logic that supports the (at least some) generic Web application activities, thereby creating a corresponding customized command tag that is capable of being embedded within a Web page. The customized command tag includes the ability to conditionally execute the specified (at least one) custom action based on run-time conditions. The customized command tag is embedded in a Web page of the Web application. During run-time operation of the Web application, the customized command tag is invoked for conditionally executing the specified (at least one) custom action based on run-time conditions.

During typical development of a Web application using the framework, the Web application's user interface and workflow are implemented using Hypertext Markup Language (HTML) and the framework's markup tags. In particular, the framework's markup tags provide services that would otherwise have required a more expensive programming implementation, such as Java code embedded within JSP pages. Hence, the framework's markup tags speed Web page development and reduce coding errors. By employing these markup tags and software objects for developing on-line media management applications, much of the need for programmers to design, develop, and test custom solutions is eliminated. Instead, these features are directly and conveniently implemented by Web page designers, using the framework's markup tags and software objects.

An improved gateway for related software and devices to access a media store via Hypertext Transfer Protocol (HTTP) requests and responses is also described. This facilitates the creation of information channels into an on-line media store and organization infrastructure, which are designed to be used by clients that are not Web browsers, including desktop applications, handheld device applications, media management infrastructure software, or the like. This feature may be used to provide information about the media store in the form of Extensible Markup Language (XML) or other markup languages. Additionally, the feature allows external applications to issue commands to the media store (via the gateway) using simple HTTP requests.

BRIEF DESCRIPTION OF THE DRAWINGS

FIG. 3 shows a Java class diagram for the abstract base classes in the application framework.

GLOSSARY

Figure 1:
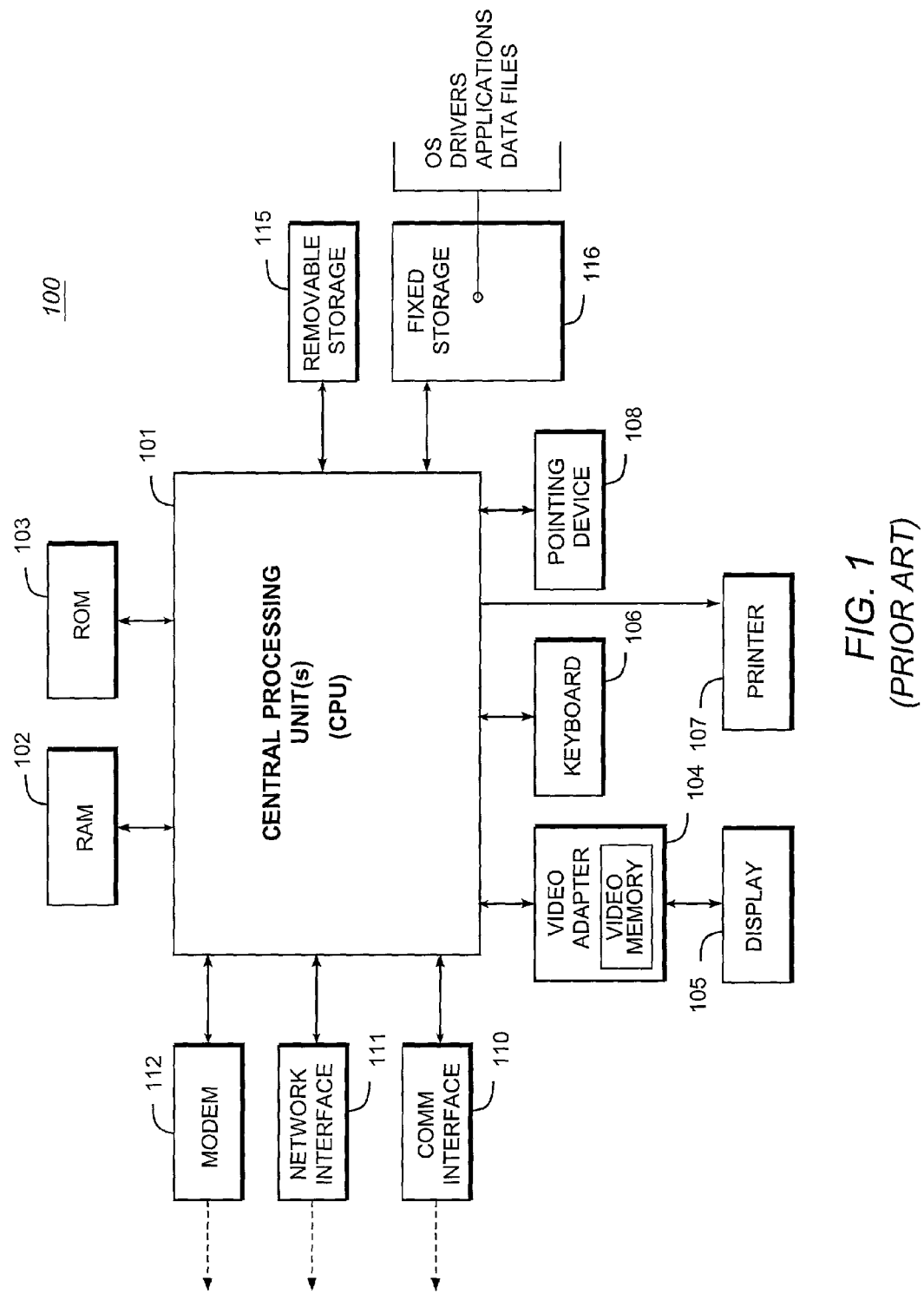
FIG. 1 is a block diagram of a computer system in which software-implemented processes of the present invention may be embodied.

Abstract classes: An abstract class is an object-oriented programming class that is not completely implemented and defined, and, therefore, is but an abstract manifestation of a class that cannot compile into an instance of a runtime object. Developers must extend, and fully define, a subclass derived from an abstract class to use it.

API: API is the acronym for Application Programing Interface, which is a set of routines, protocols, and tools for building software applications. A good API makes it easier to develop a program by providing all of the building blocks. A programmer puts the blocks together. Most operating environments, such as MS Windows, provide an API so that programmers can write applications consistent with the operating environment. Although APIs are designed for programmers, they are ultimately good for users because they guarantee that all programs using a common API will have similar interfaces. This makes it easier for users to learn new programs.

ASP: ASP is the acronym for Active Server Pages. ASP is a specification, created by Microsoft Corporation, for a dynamically-created Web page with a .asp extension that utilizes ActiveX scripting—usually VB Script or Jscript code. When a browser requests an ASP page, the Web server generates a page with HTML code and sends it back to the browser. Therefore, ASP pages are similar to CGI scripts, but they enable Visual Basic programmers to work with familiar tools.

Business object: A business object is the context for an entity, which is dependent upon the domain specific to an application. Business objects are object-oriented notions that map real-world entities to encapsulating software objects. For example, a photograph is a real object in the real world; so is a banking account. The photograph business object belongs within the context of the media domain; the banking account business object belongs within the context of the banking services domain. Object-oriented software represents these business objects with programmatic classes, depending upon the vertical application. Both an on-line media sharing service and an on-line banking service might implement a business object that represents a "user account."

CFML: CFML is the acronym for Cold Fusion Markup Language, which is featured in the Cold Fusion software product. Cold Fusion, which was created by Allaire Corporation of Cambridge, Mass., includes a server and a development toolset designed to integrate databases and Web pages. With Cold Fusion, a user could enter a zip code on a Web page, and the server would query a database for information on the nearest movie theaters and present the results in HTML form. Cold Fusion Web pages include tags written in Cold Fusion Markup Language (CFML) that simplify integration with databases and avoid the use of more complex languages like C++ to create translating programs.

CGI: CGI is the acronym for Common Gateway Interface, a specification for transferring information between a World Wide Web server and a CGI program. A CGI program is any program designed to accept and return data that conforms to the CGI specification. The program could be written in any programming language, including C, Perl, Java, or Visual Basic. CGI programs are the most common way for Web servers to interact dynamically with users. Many HTML pages that contain forms, for example, use a CGI program to process the form's data once it is submitted. Another increasingly common way to provide dynamic feedback for Web users is to include scripts or programs that run on the user's machine rather than the Web server. These programs can be Java applets, Java scripts, or ActiveX controls. These technologies are known collectively as client-side solutions, while the use of CGI is a server-side solution because the processing occurs on the Web server. One problem with CGI is that each time a CGI script is executed a new process is started. For busy Web sites, this can slow down the server noticeably. A more efficient solution, but one that it is also more difficult to implement, is to use the server's API, such as ISAPI or NSAPI. Another increasingly popular solution is to use Java servlets.

Collection: The term "collection," as used in this disclosure, describes a group of elements, such as photographs or audio clips, that can be implemented as an array or any descendent of the Java Collections framework. They are usually arrays of objects, but the implementation should not matter. One embodiment tag might use a java.util.Vector to store data and another could use an array of data objects.

COM: COM is the acronym for Component Object Model, which is a model for binary code developed by Microsoft Corporation. The Component Object Model enables programmers to develop objects that can be accessed by any COM-compliant application. Both OLE and ActiveX are based on COM.

Compact HTML: Compact HTML defines a subset of HTML for small information appliances such as smart phones, smart communicators, mobile PDAs, or the like. Such a subset is helpful as a guideline from the manufacturers of small information devices, service providers, carriers, and software developers. Since "Compact HTML" is completely based on HTML, one can use millions of HTML-based content resources, various software tools, and public materials (textbooks, magazines, and Web information).

Container: A Container is a Java interface that can be used to implement a container for a collection of business object elements in a Web-based application; the Container also has metadata for the collection.

Element: An Element is a Java interface for a business object in a Web-based application.

HDML: HDML is the acronym for Handheld Device Markup Language and is used to format content for Web-enabled mobile phones. HDML is phone.com's (formerly known as Unwired Planet) proprietary language, which can only be viewed on mobile phones that use phone.com browsers. HDML came before the WAP standard was created. It uses the telecommunications Handheld Device Transport Protocol (HDTP), instead of WAP. Phones access HDML sites the following way: Once the URL is typed into the phone, the phone sends the request to phone.com's UP.Link gateway. The gateway sends an HTTP request to the Web server. The Web server returns the page via HTTP to phone.com's UP.Link gateway. The gateway sends the data via HDTP to the wireless carrier's network and down to the phone. HDML and the phone.com gateway are the most popular standard throughout North America. In Europe, WML and the Nokia WAP gateway and browser are the emerging standard. Some versions of phone.com browsers do interpret basic WML.

HTTP: HTTP is the acronym for Hypertext Transfer Protocol, which is the underlying communication protocol used by the World Wide Web on the Internet. HTTP defines how messages are formatted and transmitted, and what actions Web site servers and browsers should take in response to various commands. For example, when a user enters a URL in his or her browser, this actually sends an HTTP command to the Web site server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3C).

Java: Java is a high-level programming language developed by Sun Microsystems. Java was originally called Oak, and was designed for handheld devices and set-top boxes. Oak was unsuccessful so in 1995 Sun changed the name to Java and modified the language to take advantage of the burgeoning World Wide Web. Java is an object-oriented language similar to C++, but simplified to eliminate language features that cause common programming errors. Java source code files (files with a Java extension) are compiled into a format called "bytecode" (files with a class extension), which can then be executed by a Java interpreter. Compiled Java code can run on most computers because Java interpreters and runtime environments, known as Java Virtual Machines (JVM), exist for most operating systems, including UNIX, the Macintosh OS, and Windows. Bytecode can also be converted directly into machine language instructions by a just-in-time compiler (JIT). Java is a general-purpose programming language with a number of features that make the language well-suited for use on the World Wide Web. Small Java applications are called Java applets and can be downloaded from a Web server and run on a user's computer by a Java-compatible Web browser, such as Netscape Navigator or Microsoft Internet Explorer. Further description of the Java Language environment can be found in the technical, trade, and patent literature; see e.g., Gosling, J. et al., The Java language environment: A White Paper, Sun Microsystems Computer Company, October 1995, the disclosure of which is hereby incorporated by reference.

JavaBeans: JavaBeans is a specification developed by Sun Microsystems that defines how Java objects interact. An object that conforms to this specification is called a JavaBean, and is similar to an ActiveX control. It can be used by any application that understands the JavaBeans format. The principal difference between ActiveX controls and JavaBeans are that ActiveX controls can be developed in any programming language but executed only on a Windows platform, whereas JavaBeans can be developed only in Java, but can run on any platform.

JVM: JVM is an acronym for Java Virtual Machine. Java virtual machines are platform-specific programs that execute platform-neutral Java bytecode by converting a program's bytecode into platform-specific instructions and executing them. Most programming languages compile source code directly into machine code that is designed to run on a specific microprocessor architecture or operating system, such as Windows or UNIX. A JVM—a machine within a machine—mimics a real Java processor, enabling Java bytecode to be executed as actions or operating system calls on any processor regardless of the operating system. For example, establishing a socket connection from a workstation to a remote machine involves an operating system call. Since different operating systems handle sockets in different ways, the JVM translates the programming code so that two machines that may be on different platforms are able to connect.

JSP: JSP is the acronym for JavaServer Pages, which is a server-side technology. JavaServer Pages are an extension to the Java servlet technology that was developed by Sun Microsystems as an alternative to Microsoft's ASPs (Active Server Pages). JSPs have dynamic scripting capability that works in tandem with HTML code, separating the page logic from the static elements—the actual design and display of the page. Embedded in the HTML page, the Java source code and its extensions help make the HTML more functional, for example, by being used in dynamic database queries. JSPs are not restricted to any specific platform or server.

Media store: The media store consists of a media file, which can be a photograph, an audio file, or a video file, stored on disk, and its associated metadata, stored in a database. These resources are available to the application server.

Page: A page is a unit of content transferred by a complete HTTP response to a device that initiated the Internet communication by an HTTP request for some information to be transferred.

Photo sharing: Photo sharing is the exchange mechanism on the Web, whereby one party can enable other parties to visit the URL that serves digital media belonging to the first party.

Properties (JavaBean): Properties are read/write-accessible instance variables of JavaBeans.

Request parameter: When an HTTP form is submitted by the user, form field values are returned to the HTTP server as request parameters along with the same names as the form field elements.

Tag: A tag, or markup tag, is particular syntax for embedding metadata into a scripting language that prompts the runtime interpreter on how to process its subsequent content.

URL: URL is the acronym for Uniform Resource Locator, the global Internet address of documents and other resources on the World Wide Web.

WAP: The Wireless Application Protocol is a secure specification that allows users to access information instantly via handheld wireless devices such as mobile phones, pagers, two-way radios, smartphones and communicators. WAP supports most wireless networks, including CDPD, CDMA, GSM, PDC, PHS, TDMA, FLEX, ReFLEX, iDEN, TETRA, DECT, DataTAC, and Mobitex.

WML: WML is the acronym for the Wireless Markup Language, which is an XML language used to specify content and user interface for WAP devices; the WAP forum provides a DTD for WML. WML is supported by almost every mobile phone browser around the world. WML pages are requested and served in the same way as HDML pages. For Web servers to serve WML pages, they must contain the text/vnd.wap.wml mime-type.

XML: XML is the acronym for the Extensible Markup Language which is a specification developed by the W3C. XML is a pared-down version of SGML that is designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium, the disclosure of which is hereby incorporated by reference. The specification is also currently available on the Internet.

DETAILED DESCRIPTION OF A PREFERRED EMBODIMENT

The following description will focus on the presently-preferred embodiment of the present invention, which is implemented in an Internet-connected computing environment, including desktop and server components (e.g., operating on Intel-compatible hardware running under Microsoft Windows 2000 or XP operating system). The present invention, however, is not limited to any particular application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation. For simplicity, in the present Application the terms "Java," "Java Bean" and "JSP" are used to refer to a programming language, classes within programming languages, and server-side technology to enable scripting capabilities, respectively. Sun Microsystems owns the trademarks to the terms "Java", "Java Bean" and "JSP". One of skill in the art would understand that alternative programming languages, classes, and server-side technologies may be used without going outside the scope of the present description.

Computer-based Implementation

A. Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen 105. Likewise, the pointing device 108, such as a mouse, track ball, pen device, or the like, permits selection and manipulation of objects on the display screen. In this manner, these input devices support manual user input for any process running on the system.

The computer system 100 displays text and/or graphic images and other data on the display device 105. Display device 105 is driven by the video adapter 104, which is interposed between the display 105 and the system. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
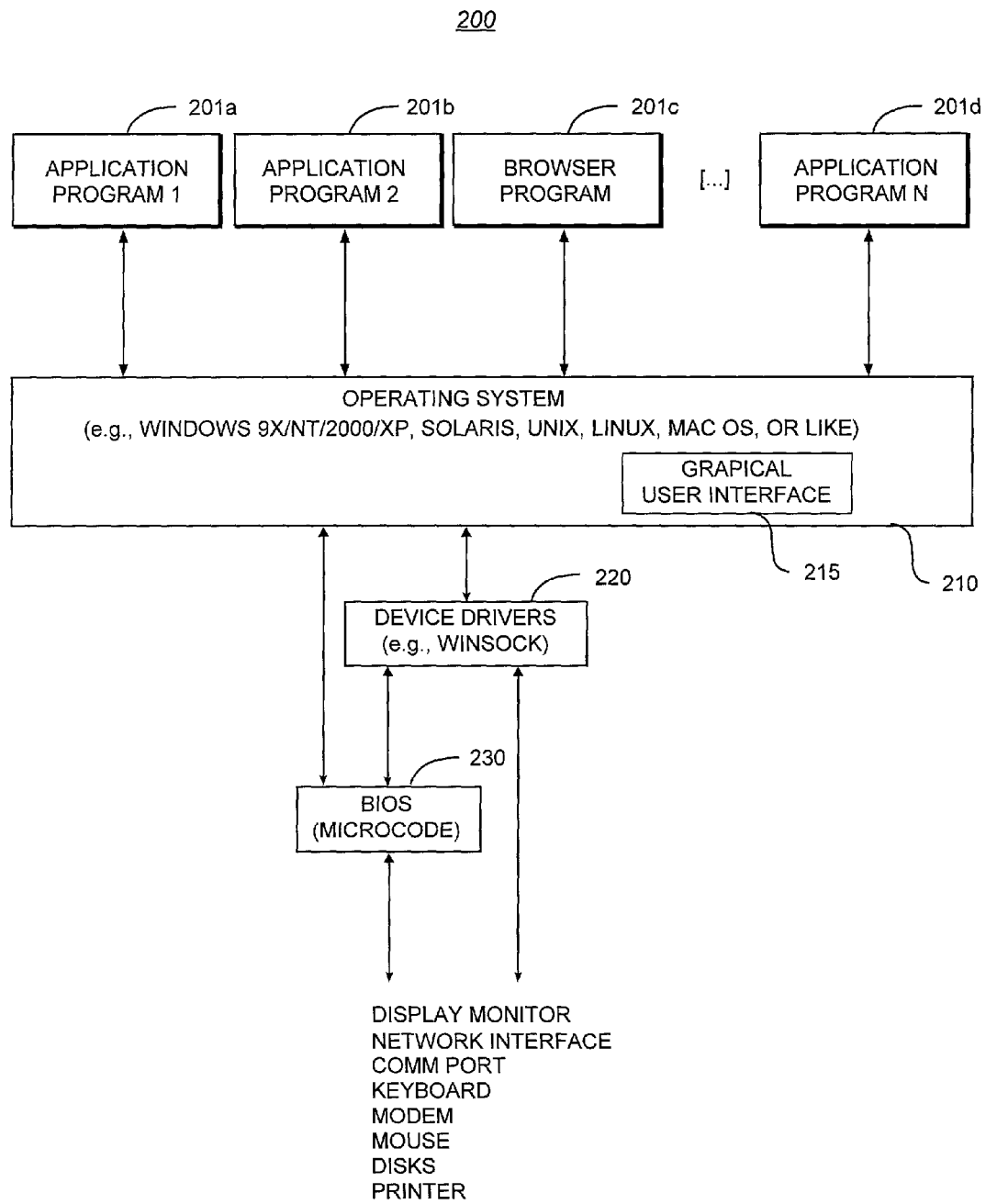
FIG. 2 is a block diagram of a software system for controlling the operation of the computer system of FIG. 1.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) which communicates with one or more "clients" (e.g., desktop computer operating browser software). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Software Framework for Web-based Applications

A. Overview

The present invention provides a Web-based application construction framework. The application framework includes code modules (classes) that are written in the Java programming language and run in the Java Virtual Machine (JVM). Public APIs are used by the framework classes, particularly the JavaServer Pages API from Sun Microsystems. In general usage, users (developers) of the application framework write Web pages using a mixture of HTML, JavaServer Pages standard tags, and the application framework's own custom markup tags. These pages are served from a JSP-compatible Web/application server.

The user interface and workflow of an application created with the framework are implemented in Hypertext Markup Language (HTML) and the application framework's custom markup tags. The tags follow the same coding style used by the standard markup language (e.g., HTML) tags, and the currently-preferred embodiment has a corresponding Java class framework underlying the tags. All embodiments of the application contain the following framework classes of custom tags: tags which process commands, tags which represent business objects and collections of business objects, tags which retrieve data from business objects, tags which conditionally include content based on the application state, and tags which conditionally include content based on the enclosing tag data. The custom markup tags alleviate much of the need for Java scripting throughout the JSP Web application pages.

In one embodiment of the invention, a generic tag framework implements design patterns that are inherent in both Web applications and the organization of object-oriented entities. The nature of the specific business objects and their exposed data will depend on the focus of the Web application being created using the framework classes. In one implementation of this invention, the business objects are designed to represent digital image organization and sharing objects such as photos, albums, email addresses, and photo greetings. Other vertical applications require the developer to extend either the underlying abstract Java business object classes in the framework or the base tag classes provided by the JSP specification, mapping new attributes in their extended tag classes to corresponding new properties in their extended JavaBeans classes.

The application framework includes five major abstract classes in which to create a Web application workflow: AbstractConditionalTag, AbstractCommandTag, AbstractPropertyConditionalTag, AbstractListTag, and AbstractPropertyTag. These classes interact with two other classes, TagSupport and BodyTagSupport, which are part of the JavaServer Pages API. Collectively, these classes support framework tags that provide "application-like" behavior for a set of JSP pages, as described below. Additional tags that represent business objects may also be part of the Web application, but the specific vertical domain of the business objects is unrelated to the framework tags. Additional tags may participate in some of the framework capabilities by implementing framework interfaces. For example, domain-specific tags that implement the interface PropertySource can be read by tags that descend from the core tag, AbstractPropertyTag, and domain-specific tags which implement the interface Pageable can be manipulated by the utility tag PaginateTag.

B. System Architecture

The application framework of the present invention includes tags for web pages. The tags themselves are code modules (classes) written in the Java programming language, which run within a Java Virtual Machine (JVM) on the server-side of a client/server Web application. These tags call runtime classes in the framework that execute, leaving hooks for the developer to insert minimal specific code. Public APIs are used by the framework classes, particularly the JavaServer Pages API from Sun Microsystems. Users of the application framework write Web pages using a mixture of HTML tags, JavaServer Pages (JSP) tags, and the application framework custom tags of the preferred embodiment. These Web pages are served from a JSP-compatible Web/application server.

The framework is deployed at runtime as a Java runtime library enabling Web page developers to quickly build rich interactive applications. Many Web applications execute on a server computer, and communicate with the end-user's browser using HTTP protocols. Today, Java servlets are a popular choice for building and executing interactive Web applications. A servlet is a Java CLASS file that processes HTTP requests within a runtime Java application. A popular development/deployment environment for servlet-based Web applications employs the JSP software development kit (i.e., the JavaServer Pages 1.1 specification) to build an application, and a servlet engine to execute the servlets that are generated/compiled/run within a JVM on a server computer at runtime.

JSP pages are text files, scripted with mark-up tags that resemble, and include, HTML tags found in a typical HTML text file. The tag types include: HTML or XML tags, JSP specific tags, and custom tags developers use to extend the functionality of the base custom tags included in the preferred embodiment. One JSP page cardinally represents one Web page. The execution of a JSP page (in a Web server environment) is launched when an end-user, acting as the client from his or her browser, either submits the Uniform Resource Locator (URL) address referencing that JSP page or clicks on a hyperlink (in the antecedent Web page) to that JSP page.

FIG. 3A is a graphic representation of the text (script) content of a typical JSP ASCII file. FIG. 3A includes the view of the entire JSP page 300, the beginning point for the automatic processing enabled by a customized start tag 310, a hook in the execution path where the Web page designer may optionally insert any JSP-compatible tags or scripting (indicated by the ellipsis at 315), and the ending-point for the automatic processing enabled by a customized start tag 320. The JSP page is created by a Web (page) designer, using standard off-the-shelf HTML editing software. The content of a JSP page may include a mix of interleaving: HTML tags, JSP-specific tags, third-party custom tags, extensions to base custom tags, and scripted Java code. However, the preferred embodiment enables non-programmatic Web page designers to develop entire rich dynamic Web applications using tag-based editing solely. Within the body of the JSP text, the Web application developer can include the custom tag text 310 indicating when a custom behavior, or action begins.

The script in the JSP page is executed sequentially by the servlet engine at runtime. Subsequent to the inclusion of the start for the custom tag 310, the developer must append the custom tag end-tag 320 indicating when the processing of the custom/extended tag code block terminates. This is a standard style for all types of tags: for each inclusion of a type of tag in an application, beginning a code block with a start-up tag, and ending that code block with an end or stop tag. Stop tags are identical to their corresponding start-up tag, except a stop tag appends a backslash character to the name of the tag type. The following are two typical forms of starting and ending tags within a Web page or any XML document:

<custom-tag-name an-attribute-name="anAttributeValue"><custom-tag-name/> or

<custom-tag-name an-attribute-name="anAttributeValue"/>

FIG. 3B is a block diagram illustrating the transition, or runtime compilation, of the JSP script or source code to a fully-compiled servlet. All of the components in FIG. 3B operate within the Web server environment. FIG. 3B includes the previously-mentioned JSP page 300, a servlet engine 330, and an executable servlet CLASS file 340. At runtime, the first time the JSP page 300 is submitted by a user from a Web browser, the servlet engine 330 parses the text of the JSP page, and interprets/compiles the JSP source instructions into a corresponding executable Java CLASS file 340 that extends the Java servlet interface. In this manner, the JSP source or script instructions are easily converted into an executable servlet at runtime.

Figure 4A:
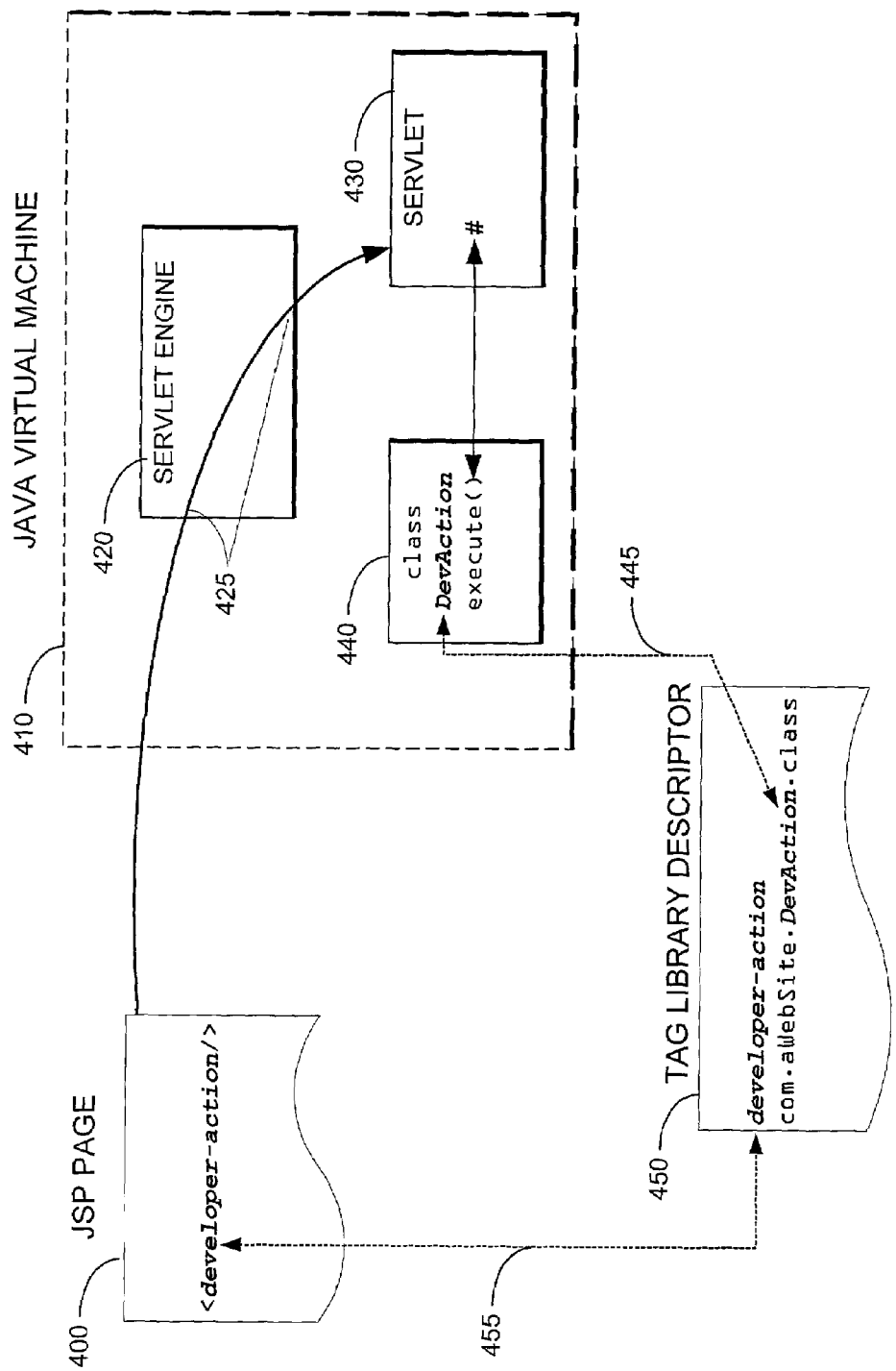
FIG. 4 shows a Java class diagram for the exception classes in the application framework.

FIG. 4A is a block diagram illustrating the context and components involved in the runtime compilation and execution of the Java servlet which processed the instructions in the JSP page. The environment illustrated in FIG. 4A includes a JSP page 400 with an embedded customized framework tag (named developer-action, as an example), a JVM runtime environment 410, and a tag library descriptor file 450 supporting mapping of the developer-defined name of the developer's extended custom tag. As shown, the JVM runtime environment 410 includes a servlet engine 420, a servlet 430, and an executable Java CLASS 440 (named DevAction, for example). Execution path 425 illustrates that the servlet engine 420 compiles the JSP page 400 into the servlet 430, which is executed at runtime. In this context, the tag library descriptor file 450 supports a mapping for the developer-defined name of a developer's extended tag Java CLASS 440 (shown at 445) from the class file 440 and a mapping (shown at 455) from the JSP page 400 into corresponding descriptors in the tag library descriptor file 450.

During design time, the (Web-based) developer defines a custom desired behavior, or action for a Web application, such as, in a banking application, logging a customer deposit to a back-end database. In typical usage, the (Web-based) developer works in conjunction with a Java programmer who codes the action by extending an abstract Java class from the set of framework tags, or such code may be provided as a pre-existing library (e.g., library of banking business objects/actions). The programmer assigns desired developer-defined names to his or her extended tag subclass 440, e.g., DevAction, and enters the fully qualified network class name for DevAction in the tag library descriptor text file 450. This entry, which maps to the tag library descriptor file as shown at 445, identifies the name of the extended tag class.

The functionality of the newly-crafted extended tag class is published to the Web designer. Because of the flexibility provided by the tag library descriptor file 450, the Web designer has the flexibility to arbitrarily name the tag he or she will include when writing JSP Web pages. For example, the Web page designer may name the developer-defined action tag, developer-action. The Web page designer enters the tag name in the tag library descriptor text file 450. This entry (mapped via 455) identifies the name of the custom JSP tag used by a servlet to invoke the corresponding extended tag action subclass. The preferred embodiment provides the abstract parent classes, such as the AbstractCommandTag class, for extending tags, which comes with a predefined method, such as execute ( ). While the corresponding compiled servlet is running (it embodies the JSP page) and starts processing a custom tag, such as developer-action, it calls the execute ( ) method on an instance of the extended tag class, DevAction. The programmer had over-ridden the parent definition of the execute ( ) method, in DevAction, to define a custom action for the Web application.

The AbstractCommandTag class is a powerful extensible module that encapsulates such generic Web application features as conditional execution of a specifiable action based upon an HTTP (Web) request being processed by a servlet and conditional Web page routing. Conditional execution may be triggered by the automatic filtering of the HTTP request parameters to match with attributes included in the custom tags. Conditional page routing may be triggered by the state(s) of execution of the specified action, in response to which the servlet re-routes the application flow to another (specified) Web page.

Figure 4B:
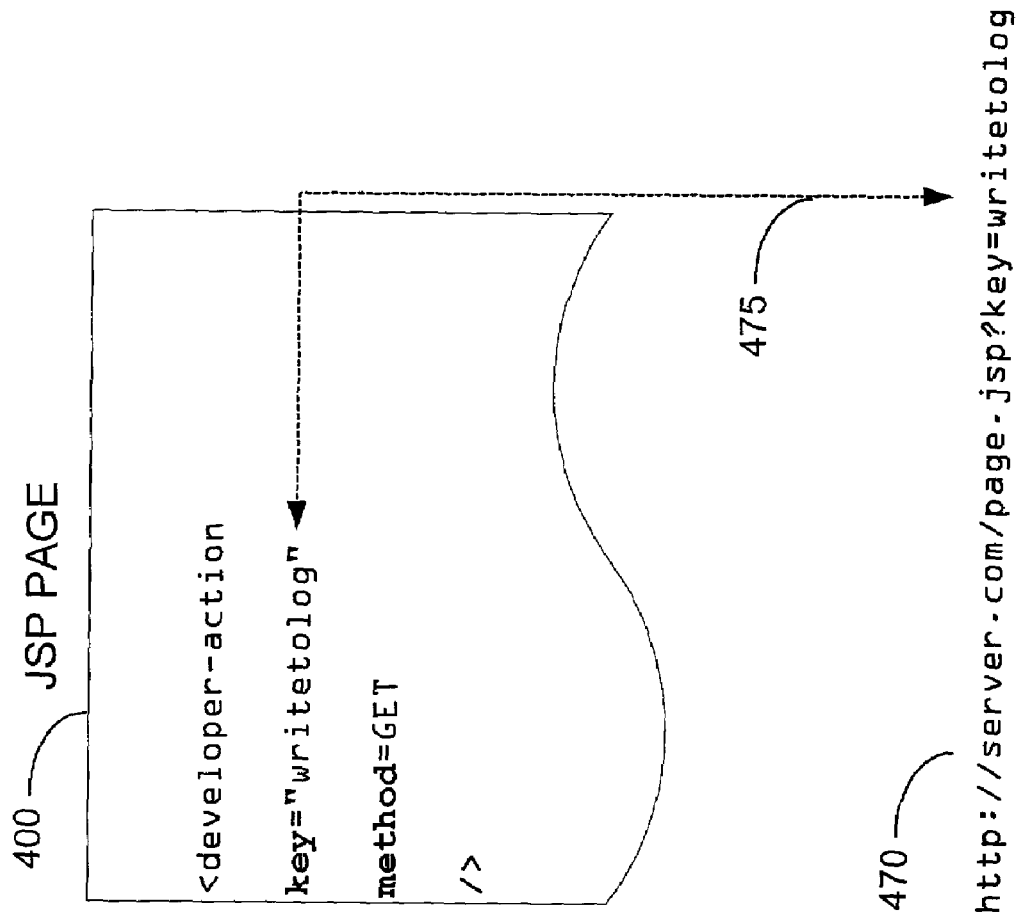

FIG. 4B is a diagram of a JSP page which illustrates request filtering that, for example, tests for string matches between the custom tag attributes, as specified by the Web page designer in the Web page text, and the HTTP request parameters passed to the current Web page. As shown, FIG. 4B includes a JSP page 400, an HTTP request 470 passed to the servlet, and a mapping/matching line 475 indicating a matching values set for matching names for a custom tag attribute and an HTTP request parameter. In this example, both the custom tag has an attribute and the HTTP request has a parameter named "key," and both the attribute and parameter have matching values, namely "writetolog". Also in this example, writetolog ( ) is provided as a developer-defined action in a banking application that records a new customer deposit to a back-end database. The HTTP GET method may be to iterate through the request parameters.

Conditional page routing may be easily implemented using the AbstractCommandTag's "onFailure" tag attribute. If the customized action fails for any reason, the default behavior is to re-route the application to load another JSP page that is specified in the value of the "onFailure" tag attribute. The extended tag in the JSP page may, for instance, be constructed as follows:

<bank-deposit-tag onFailure="http://bankServer.com/depositerrorpage.jsp"/>

C. Command Processing

Software applications require code modules to interpret the actions of the user, execute processes on the user's behalf, and report to the user the results of his or her actions. In a Web application, user actions often consist of filling out HTML form elements and submitting information to a URL or clicking on images, buttons, links, or the like. These actions result in an HTTP request, which is processed by a server-side program, the output of which is reported back to the user in the form of an HTTP response. Web applications most often report command results by serving an HTML page that may be dynamically generated. In the present invention, Java classes that extend AbstractCommandTag perform command processing and page routing. Tags that extend these abstract classes are placed in the JSP files that are the target of a user action; for example, the page listed in an anchor tag or the page listed as the "action" attribute of a form tag. When a user action results in an HTTP request for the target page, each command tag present in the target page evaluates the request, then typically proceeds to perform some action, register one or more recoverable error objects, and/or redirect or abort page processing. These actions are described in detail below.

Because a single JSP page may be the target of many different types of requests, the AbstractCommandTag class provides features that allow the page designer to specify which requests to process. The AbstractCommandTag class can optionally filter requests based on an HTTP request method (most frequently either GET or POST). This filtering is accomplished by adding an attribute to the command tag named "method," and setting the value of that attribute to any valid HTTP method or the keyword "ANY," which allows execution on any of the request methods. For example, a command tag that only responds to POST requests would be written as:

<doSomething method="POST"/>

When a client requests the page containing the above example tag using the HTTP GET method, the command tag is not executed. In addition to the HTTP "method" attribute, command tags can be filtered on a special request parameter named "key." By including a parameter named key on the request and specifying a value for the command tag attribute named key, the page designer can further refine when a command tag is executed. The value of the key request parameter and the value for the key tag attribute need only match; there is no predetermined vocabulary for this attribute.

If the HTTP request is determined to be applicable to a given command tag in the target page, the tag performs its designed action. Some example actions include sending electronic mail, updating database records, and writing data to disk. Typical actions performed on the user's behalf may fail, and these failures may be loosely grouped into two classes: recoverable and non-recoverable. The present invention provides a method for the page to dynamically report recoverable failures to the user and allow him or her to correct the data state that led to the failure. Each JSP page can contain a list of recoverable failures (which have occurred during command tag processing) that is created when page processing begins, and is destroyed at the end of page processing. Command tags can add Java exception objects that descend from the AbstractCommandTag class to the failure list, and subsequent tags in the page can examine the failure list for recoverable errors. Descriptive exception classes may be derived from CommandTagException to further refine error handling and reporting. For example, the framework defines a class named RegistrationException which extends CommandTagException but is used by the member registration pages to indicate failures.

Page designers will often wish to redirect a user's request based on the result of the command tag processing. Command tags provide optional page routing facilities to support this feature. The AbstractCommandTag class allows the designer to specify a destination page when the command tag processing fails, as indicated by a recoverable error, or when the command tag processing succeeds, as indicated by a lack of any errors. The designer can choose to use either in-process request forwarding as provided by the JavaServer Pages specification or an HTTP redirect response.

D. Business Objects and Collections

As described previously, one implementation of the present invention provides classes and corresponding tags that represent business objects, and collections of business objects, for a digital media organization and sharing application. This implementation provides tags that expose these media objects and collections to the page designer and impose a containment hierarchy that requires minimal knowledge of the mechanics of the interactions between business objects. While the examples of the invention use media sharing business objects, the framework is not limited to operating upon these objects. For example, the framework could be used to control an on-line banking application or on-line auction site.

The main business objects used to illustrate the framework are listed in Table 1. Two basic approaches may be used to represent business objects as tags in the page. The developer can either extend tag classes that map directly to business objects, as was done in the Address and the Sharing functional areas, or he or she can map tags to the base abstract classes or interfaces implemented by the business objects, as was implemented in the Media functional area.

TABLE 1

Business Objects in Underlying Store (Abstract classes listed in italics)

| Functional area | Containers | Objects |
| --- | --- | --- |
| Address | AddressList | Address |
|  |  | ExtendedAddress |
| Media | *Container* | *Element* |
|  | Album | Photo |
|  | Greeting | Video |
|  | Inbox | Audio |
|  | Roll |  |
| Sharing | Share | Invite |
|  |  | Comment |

Certain business objects "contain" other business objects. For example, an Album business object "contains" Photo business objects. In the media functional area, objects representing digital media such as digital photographs, audio, and video implement an interface named Element. Objects that represent containers for Elements, such as Album, implement an interface named Container. Collections of Element or Container objects are enclosed by additional tag classes representing that collection of Elements or Containers. Since page designers may want to access business objects polymorphically, the tag classes conceptually map to the interface classes rather than to the concrete implementers of those classes. These classes contain optional attributes that allow the page designer to specify which specific subtype of Element or Container for the tag to represent. For example, the <containers> tag can represent either an Album or a Greeting container as follows:

<containers typeCode="album">
<containers typeCode="greeting">

When the <containers> tag is used without a "typeCode" attribute, it represents all available containers regardless of type; therefore, it could be used for either albums or greetings. The tag class takes advantage of polymorphism in its associated business object class to reduce the number of specific business object tags in the vertical application. In contrast, Business objects in the Address and the Sharing functional areas are represented directly by custom tags in the media embodiment.

The actual containment hierarchy and collection rules of the associated business object classes are reflected in the design of the custom tag classes that correspond to the business objects. For example, an AddressTag class represents the Address business object. AddressTag custom tags may be used alone on the page, but in this usage mode the page designer must provide sufficient information to identify which particular business object in the media store the tag is meant to represent. The AddressListTag class represents the AddressList business object. A custom tag class named AddressesTag represents a collection of Address business objects. This tag has no direct equivalent business object, but it is used alone or in conjunction with other tags that represent objects containing lists of Addresses, such as the AddressList business object. The general pattern of containment in the invention is a container-enclosing collection that encloses contained objects. This pattern may be nested indefinitely if the contained object itself contains further business objects.

All collection tags descend from the AbstractListTag abstract class. In general, tags that are named with an English plural represent collections of objects, while tags named with an English singular represent a single object. Table 2 lists representative usage patterns of the custom tags just described.

TABLE 2

Example Tag Constructs

| Example | JSP page construct | Business object representation |
| --- | --- | --- |
| 1 | <address> | Represents a single address. |
|  | ... | Information about the address is |
|  | </address> | available inside the body of the tag. |
| 2 | <addresses> | Represents multiple addresses. |
|  | <address> | May optionally iterate over the list of |
|  | ... | addresses it represents. |
|  | </address> | address tag behaves as in example 1 |
|  | </addresses> |  |
| 3 | <address-list> | Represents a single address list and its |
|  | <addresses> | contained addresses. |
|  | <address> | addresses tag behaves as in example 2. |
|  | ... | address tag behaves as in example 1. |
|  | </address> |  |
|  | </addresses> |  |
|  | </address-list> |  |
| 4 | <address-lists> | Represents a collection of address lists. |
|  | <address-list> | address list tag behaves as in example |
|  | <addresses> | 3. |
|  | <address> | addresses tag behaves as in example 2. |
|  | ... | address tag behaves as in example 1. |
|  | </address> |  |
|  | </addresses> |  |
|  | </address-list> |  |
|  | </address-lists> |  |

Business object tags impose strict scoping rules for information access within the JSP page. Information about a particular business object represented in the page by a custom tag class is only available between the opening and closing tag elements in the page. Requests for information that are placed out of scope result in non-recoverable exceptions, which allow syntax errors to be quickly found and corrected during the design phase of the Web application.

The business object tags which interact with collection tags or other business object tags are endowed with automatic inference of their scope within the page. For example, if a tag implemented by the AddressesTag class is placed inside a tag implemented by the AddressListTag class, the AddressesTag fetches from the media store only the Address objects that are present in the AddressList object represented by the enclosing AddressListTag object.

Collection tags, by virtue of their inheritance from the AbstractListTag class, can optionally iterate over their contents, repeating the text contained between their start and end tags once for each object in the collection. In addition, collection tags may interact with utility tags that implement paging and other useful algorithms.

Business object tags can participate further in the framework design by implementing framework interfaces. In the present invention, two main interfaces are provided: PropertySource and Pageable. Business object tags that implement the PropertySource interface expose the properties of their underlying business objects to tags descended from AbstractPropertySource. Business object tags that implement the Pageable interface allow their state to be modified by the utility tag, <paginate>, which breaks up long lists of objects into pages.

E. Data Input and Retrieval

While the tag classes described above represent business objects and collections, they provide no direct mechanism for both setting and retrieving information in their represented objects and displaying it in the JSP page HTML output that is returned to the application user. The following describes a generalized method for setting and retrieving business object properties in accordance with the present invention.

A primary design in the framework is that all tags which retrieve and modify data in the underlying business objects use the JavaBeans 1.2 specification (i.e., available from Sun Microsystems) for property access; that is, if a class has public get and set methods, it is said to support that property. For example, the following code, in accordance with the JavaBeans specification, indicates that the object has a property named "elementID."

public long getElementID( );
public void setElementID(long elementid);

These property names are used in the JSP pages to set data in and get data from the underlying objects. Whether or not the implementation of the tags actually uses JavaBeans Reflection to get and set data, the restriction on naming still holds. This naming convention means that the method for setting business object properties is to pass the property name and value as a request parameter, either in a URL or as part of a form that is submitted. For example, if one wanted to change the description of an Element with an elementID of 1123, one could issue the following HTTP request:

GET/page_with_modify_command_tag.jsp?elementID= 1123&description=new+description The element modification command tag in the JSP page, page_with_modify_command_tag.jsp, reads the values of the request parameters "elementID" and "description," fetches the Element business object represented by the given elementID, and calls the setDescription( ) method on that object with the value of the description request parameter ("new description") either via a direct method call or using Java Reflection. The command tag is responsible for persisting the changes in the underlying data store or cache layer. If any additional request parameters that were mapped to business object properties are present, all of the associated object setter methods would be called before the object is persisted.

Tag classes declare themselves as capable of exposing properties by implementing the Java PropertySource interface or an interface descended from PropertySource. These tags can be queried for information by tags that descend from AbstractPropertyTag. The most common of the query tags is the PropertyTag class. All property tags, by virtue of descending from AbstractPropertyTag, require a property name to retrieve from their enclosing PropertySource implementer and may contain a default value to display in cases where the property value retrieved from the property source is null or otherwise unusable.

Property tags, which are based on AbstractPropertyTag, ascend the tag containment hierarchy within the JSP page until they reach an implementer of PropertySource. Extending the PropertySource interface for specific business object classes can impose further containment control. For example, the AddressTag class, which represents Address business objects, implements an interface named AddressPropertySource, designating that it provides property information about Address objects. A corresponding property retrieval class descended from AbstractPropertyTag named AddressPropertyTag searches the tag containment hierarchy looking for tags that implement only the AddressPropertySource interface. A list of PropertySource interface descendants and their corresponding PropertyTag classes for the primary embodiment of this invention is provided in Table 3.

TABLE 3

Property Source Interfaces and Corresponding Property Tag Classes

| Interface | Property |
| --- | --- |
| PropertySource | PropertyTag |
| AddressPropertySource | AddressPropertyTag |
| AddressListPropertySource | AddressListPropertyTag |
| ContainerPropertySource | ContainerPropertyTag |
| ElementPropertySource | ElementPropertyTag |
| SharePropertySource | SharePropertyTag |

F. Conditional Content

Web applications will often include or exclude content based on application state. The most common example of this behavior is the inclusion of error messages in a page when an error condition exists. The invention provides a general method for defining custom tags that include content, and the primary embodiment of the invention includes a rich array of tags for page composition. The following is a list of examples of these tags:

1. ifRequestParameter—include/exclude based on a request parameter value.
2. ifUserAgent—include/exclude based on the HTTP User-Agent header.
3. ifMissingParameter—include/exclude based on the presence of a MissingParameterException in the page exception hold.
4. ifElementProperty—include/exclude based on the value of an element property such as creationDate, name, etc.
5. ifAddressInList—include/exclude based on the relationship between enclosing tags.

The base class for conditional tags in the invention is AbstractConditionalTag. All tags descending from AbstractConditionalTag can define the disposition of their body content through the "action" attribute by setting this attribute to "include" or "exclude," and can optionally enclose their body content in a URL via the "href" HTML attribute. The primary embodiment of the invention provides many conditional tag classes, which act based on the following conditions:

1. each type of recoverable exception previously listed in FIG. 4;
2. business object property values;
3. command tag results; and
4. collection properties—first element, last element, and so on.

A second abstract class, AbstractPropertyConditionalTag, provides more sophisticated control over page content by combining AbstractPropertyTag and AbstractConditionalTag. When placed inside a tag which implements PropertySource, tags which descend from AbstractPropertyConditionalTag can query the enclosing tag for a named property, compare it against a provided value, and include or exclude content based on the comparison. In the following example, the <account> tag contains a property named "type," which can be either "checking" or "savings." When the <account> tag represents a savings account, the text inside the <if-account-property> tag will be included in the page:

```
<account>
    <if-account-property name="type" value="savings">
        Savings account number <account-property name="acctno"/>
    </if-account-property>
</account>
```

G. Detailed Operations

Figure 5:
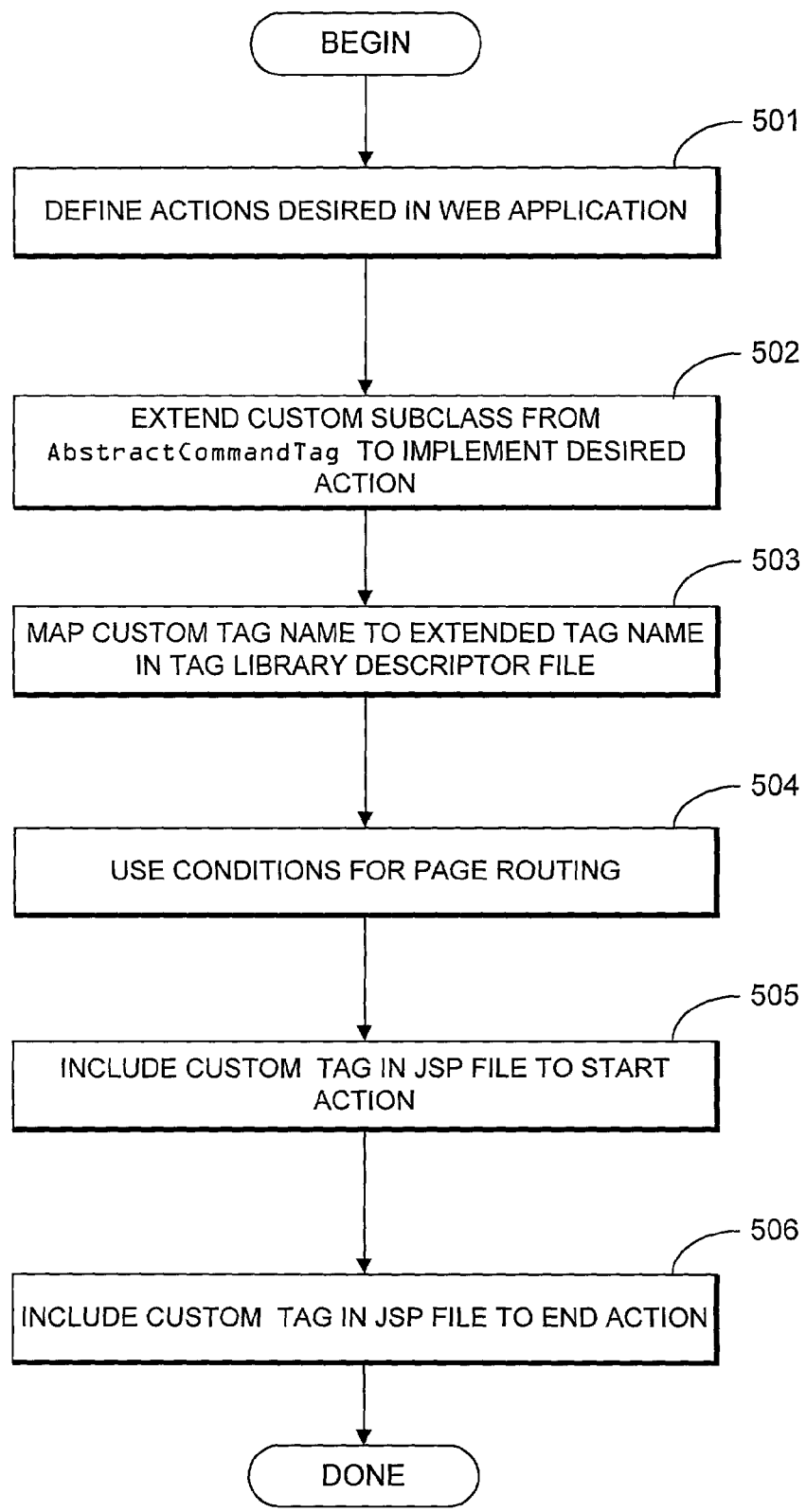
FIG. 5 shows an example of the property retrieval containment hierarchy for a media organization and sharing-type application.

FIG. 5 is a flowchart illustrating the overall methodology of the present invention for employing the custom tag library to implement web applications. At step 501, the application designers decide what actions they want their Web application to implement. For each action, at step 502, the Java programmer(s) extends the application framework's AbstractCommandTag class, and overrides its execute( ) method in the new subclass. At step 503, a corresponding entry is made in a tag descriptor file associating the name of the extended tag with the name of the extended tag class. At step 504, the Web page designer may structure various topologies for the flow of execution across Web pages by using the state of the execution (as an extended tag attribute) to re-route among the Web pages. At step 505, the Web page designer inserts an extended custom start tag, including any attributes for that tag. Finally, the Web page designer inserts the extended custom end tag, shown at step 506.

Media-specific Extension and Embodiment of the Application Framework

The on-line media domain can benefit from the facility of the preferred embodiment's framework tags in developing Web applications. This implementation demonstrates the exclusive reliance on extensions of the framework's tags for scripting JSP pages for a photo Web site application.

A. User Photo Album Listing

A typical scenario for users of a photo Web site is to get a list of his or her albums or rolls (which are containers of photographs). This example implements three tags based on the abstract tags and interfaces in the framework:

1. container, which is based on the PropertySource interface. container retrieves a single Container object. If used inside a containers tag, it requests the current Container object from the enclosing containers tag.
2. containers, which is based on the AbstractListTag. containers retrieves a list of Container objects. The Container objects returned depend on the values of the tag's attributes, in this case, the value of the typeCode attribute. containers iterates over the list of Container objects returned, including a copy of any of its bracketed body content for each iteration.
3. containerProperty, which is based on the AbstractPropertyTag. containerProperty outputs a named property of a Container object into the page, or the default value specified by the "default" attribute if the container is missing or null. Additional attributes named "plural" and "singular" allow correct English usage for numeric properties. The value of the plural attribute will be appended to the tag's body content if the numeric value of the property retrieved by the tag is not equal to one.

The value of the singular attribute will be appended to the body content if the retrieved property value is equal to one.

The sequence of this example goes as follows:
1. The first <containers> tag on the page retrieves all the user containers of type "ALBUM."
2. The <container> tag gets the current Container object from the enclosing <containers> tag.
3. The <containerProperty> tag retrieves the "title" property from the enclosing <container> tag.
4. The </containers> end tag loops back to the previous <containers> tag, repeating the text between <containers> and </containers> once for each Container object stored by the <containers> tag.
5. The second <containers> tag on the page retrieves all the user Container objects of type "ROLL."
6. The <container> tag gets the current Container object from the enclosing <containers> tag.
7. The <containerProperty> tag retrieves the "title" property from the enclosing <container> tag.
8. The <containerProperty> tag retrieves the "creationDate" property from the enclosing <container> tag. (Users may want to see the date for when their roll of film was developed. A roll of digital images at a photo Web site corresponds to a roll of film that, once developed, was scanned to produce digital representations of those photographs).
9. The </containers> end tag loops back to the <containers> tag as in step 4.

Listing 1: User Photo Album Listing Example

```
albums.jsp:
<html>
<body>
    <p>Your albums:</p>
    <ul>
        <containers typeCode="ALBUM">
            <container>
                <li>
                    <containerProperty name="title"/>
                </li>
            </container>
        </containers>
    </ul>
    <p>Your rolls:</p>
    <table>
        <containers typeCode="ROLL"/>
            <container>
                <tr>
                    <td>
                        <containerProperty name="title"/>
                    </td>
                    <td>
                        <containerProperty name="creationDate"/>
                    </td>
                </tr>
            </container>
        </containers>
    </table>
</body>
</html>
```

B. Updating Photo Information

Another user scenario occurs when the user wants to modify some of the property values for a particular photograph (the representative object of which implements the Element interface) at the photo Web site. This example implements three tags based on the abstract tags and interfaces in the framework:

1. updatePhotoCmd, which is based on the AbstractCommandTag. Given an elementID and one or more named properties that match properties in the Element interface, the updatePhotoCmd tag retrieves the Element object identified by elementID, and sets its properties to the provided values.
2. element, which is based on the PropertySource interface.
3. elementProperty, which is based on the AbstractPropertyTag.

The sequence of this example goes as follows:
1. The user clicks on a link in the first page, the element-viewing page, to update the photo information which contains the elementID associated with the photograph.
2. The element photo page is displayed with the form control pre-populated with the current element property values associated with the photograph having that elementID.
3. The user modifies the values, and then presses the submit button.
4. The <updatePhotoCmd> tag inspects the request for a parameter, named key, determines that its value matches the value of the tag's key attribute, determines that the HTTP request type is a POST, sets the photo object properties from the request parameters, and calls methods in the underlying media management software layer to save the modified Element object.
5. The user is directed back to the element-viewing page by the successful value for the onSuccess attribute of the <updatePhotoCmd> tag.

Listing 2: Updating Photo Information Example

```
element viewing page:
<element>
    <a href="update.jsp?elementID=<elementProperty name='elementID'/>">
        Update Photo
    </a>
</element>
element update page:
<updatePhotoCmd method="post" key="update" onSuccess="view.jsp"/>
<body>
    <element>
    <form method="post" action="update.jsp">
        <input type="hidden" name="key" value="update">
        <input type="hidden"
            name="elementID"
            value="<elementProperty name='elementID'/>"
        >
        <input type="text"
            name="name"
            value="<elementProperty name='name'/>"
        >
        <input type="text"
            name="description"
            value="<elementProperty name='description'/>"
        >
        <input type="text"
            name="location"
            value="<elementProperty name='location'/>"
        >
        </input type="submit">
    </form>
    </element>
</body>
```

C. Moving a Photo between Albums

Another user scenario is the user wants to move a particular photograph (which is an element) from one album (which is a container) to another. This example implements six tags based on the abstract tags and interfaces in the framework:

1. moveElementCmd, which is based on the AbstractCommandTag. Given an elementID and a destinationContainerID, the moveElementCmd class calls the routine in the underlying media management software and moves an element from one container to another.
2. element, which is based on the PropertySource interface.
3. elementProperty, which is based on the AbstractPropertyTag.
4. containers, which is based on the AbstractListTag.
5. container, which is based on the PropertySource interface.
6. containerProperty, which is based on the AbstractPropertyTag.

The sequence of this example goes as follows:
1. The user selects a destination album for the photo from the form select control.
2. The user clicks on the submit button to move the photo from one album (container) to another.
3. The moveElementCmd tag compares the value of the request parameter named key with the value of its own attribute named key. If the key values match, the tag compares the HTTP request method with the value of its attribute named method. If the method values match, the tag calls the method in the underlying media store to move the element from one container to another using the request parameters containerID, elementID, and destinationContainerID.

Listing 3: Moving a Photo between Albums Example

```
move.jsp:
<moveElementCmd method="post" key="move"/>
<body>
    <element>
    <form method="post" action="move.jsp">
        <input type="hidden" name="key" value="move">
        <input type="hidden"
            name="elementID"
            value="<elementProperty name='elementID'/>">
        <elementProperty name="name"/>
        move photo to:
        <select name="destinationContainerID">
            <containers typeCode="ALBUM">
                <container>
                    <option value="<containerProperty name='containerID'/>"
                        ><containerProperty name="title"/>
                </container>
            </containers>
        </select>
        </input type="submit">
    </form>
    </element>
</body>
```

D. Uploading Photos

Another user scenario is the user wants to upload three digital photographs from his or her computer to the photo Web site. This example implements two tags based on the abstract tags and interfaces in the framework:

1. uploadImagesCmd, which is based on the AbstractCommandTag. This tag parses the HTTP multipart/form-data POST request, saves the image files to disk, creates image metadata (Element and Photo records), and updates the status information in the request for later display to the user.
2. ifRequestMethod, which is based on the AbstractConditionalTag. This tag conditionally includes content if the HTTP request method for the page matches the method specified in its method attribute.

The sequence of this example goes as follows:
1. The user requests the upload.jsp page via an HTTP GET method.
2. The upload.jsp page is displayed. The HTTP method is GET, so the <uploadImagesCmd> tag is not executed, and the content inside the <ifRequestMethod> tag is not displayed.
3. The user selects one or more files from his or her hard drive using the <input type="file"> HTML widgets.
4. The user presses the submit button, posting the form to upload.jsp.
5. The <uploadimages> tag is activated on the POST request.
6. The image data in the multipart request is saved to disk, and metadata entries are created in the <uploadImagesCmd> implementing class.
7. The upload.jsp page is displayed, and the content in the ifRequestMethod tag is included.

Listing 4: Uploading Photos Example

```
upload.jsp:
<uploadImagesCmd method='post'/>
<html>
    <body>
        <ifRequestMethod method="POST">
            Upload complete!
        </ifRequestMethod>
        <form action="upload.jsp" method="post"
            enctype="multipart/form-data">
            <input type="file" name="image1">
            <input type="file" name="image2">
            <input type="file" name="image3">
            <input type="submit">
        </form>
    </body>
</html>
```

E. Site Authentication

Another user scenario is where the user logs in and needs to provide a valid user name and password. This example implements two tags based on the abstract tags and interfaces in the framework:
1. loginCmd, which is based on the AbstractCommandTag. This tag compares the values of the "username" and "password" request parameters to stored values in the underlying database.
2. ifCommandError, which is based on the AbstractConditionalTag interface. This tag conditionally includes content if any of the preceding command tags have added errors to the page error stack.

The sequence of this example goes as follows:
1. The user requests http://host/welcome.jsp.
2. The welcome.jsp page is displayed. The page error stack has no errors, so the <ifCommandError> tag skips the error message.
3. The user fills out his or her user name and password, and then clicks the submit button.
4. The form POSTs back to same page, where the <loginCmd> tag is activated due to the request method.
5. The methods in the <loginCmd> tag determine if both the user name and password are valid. If they are valid, the user's browser is redirected to the subsequent JSP page, typically home.jsp.
6. If either the user name or password is not valid, then the <loginCmd> tag adds an error to the page error stack.
7. The <ifCommandError> tag detects the error, and includes the error message in return to the welcome.jsp page.

Listing 5: Site Authentication Example

```
welcome.jsp:
<loginCmd method="post" onSuccess="home.jsp"/>
<html>
    <body>
        <form action="welcome.jsp" method="post">
            <ifCommandError>
                Invalid login
            </ifCommandError>
            <input type="text" name="username">
            <input type="password" name="password">
            <input type="submit" name="Login">
        </form>
    </body>
</html>
```

F. Sending and Receiving (Sharing) a Greeting

Another user scenario is when the user emails a URL linking to a digital photograph at a photo Web site, and then the recipient views that photo in his or her browser. This example implements nine tags based on the abstract tags and interfaces in the framework:
1. sendPhotoGreetingcmd, which is based on the AbstractCommandTag. Given a photo ID and at least one email address, this tag invokes the SharingService methods to create a new Share object, and to send email to the specified addresses, inviting them to return to the photo Web site and view the photo and associated information.
2. share, which represents a Share object in the underlying media store. This tag does not extend from any framework tags—it is a domain-specific tag, such as <element> or <container>. Given a request parameter named "invite," this tag retrieves the share information associated with the value of the invite parameter, and puts it into the page where it can be accessed by enclosed tags.
3. container, which is based on the PropertySource interface.
4. elements, which is based on the AbstractListTag. elements retrieves a list of Element objects.
5. element, which is based on the PropertySource interface.
6. greetingProperty, which is based on the AbstractPropertyTag.
7. containerProperty, which is based on the AbstractPropertyTag.
8. elementProperty, which is based on the AbstractPropertyTag.
9. elementhref. This tag retrieves the URL that can be used to display the Element object (photo) represented by the enclosing <element> tag. This tag does not extend from any framework tags—it is a domain-specific tag, such as <element> or <container>.

The sequence of this example goes as follows:
1. While viewing his or her on-line photo, the user clicks on the "send greeting" link, and is taken to the "send greeting" page.
2. The user fills in the form specifying an email address, a title, greeting text, and possibly color and font options, and then submits the form.
3. The "guest" receives email containing a URL pointing to the greeting, and clicks on it to go to the "guest" (share) page.

4. The <share> tag in the guest page decodes a unique ID in the URL and retrieves information that allows the standard media display tags to work within the context of the <share> tag.
5. The digital image, title, description, and formatting are displayed to the guest.

Listing 6: Sending and Receiving (Sharing) a Greeting Example

```
send greeting page:
<sendPhotoGreetingCmd method="post"
    onSuccess="/view/photo.jsp"/>
<body>
    <form action="sendgreeting.jsp" method="post">
        <input type="text" name="toAddress">
        <input type="text" name="title">
        <input type="text" name="description">
        <input type="radio" name="fontColor" value="red">
        <input type="radio" name="fontColor" value="blue">
        <input type="radio" name="fontColor" value="00FFCC">
        <input type="submit">
    </form>
</body>
guest page:
<body>
<share>
    <container>
        <elements>
            <element>
                <font color="<greetingProperty name="fontColor"/>">
                    <containerProperty name="title"/>
                    <containerProperty name="description"/>
                </font>
                <img src="<elementhref size='200'/>" border="0">
            </element>
        </elements>
    </container>
</share>
</body>
```

Specific Embodiment for Web-based Applications Having Device-neutral Non-browser Clients Another embodiment of the invention provides gateways for related software and devices to access a media store via Hypertext Transfer Protocol (HTTP) requests and responses. This embodiment facilitates the creation of information channels into the on-line media storage and organization infrastructure that are designed to be used by clients which are not Web browsers, such as desktop applications, handheld device applications, and media management infrastructure software. This embodiment of the invention may provide information about the media store in the form of Extensible Markup Language (XML), Wireless Markup Language (WML), Handheld Device Markup Language (HDML), Compact HTML, or even content which employs comma-separated values (CVS). External applications may also issue commands to the media store through the gateway using HTTP requests.

The following two JSP code blocks demonstrate the use of the tag framework, which an HTTP-based application server can use to allow a non-browser client to get a list of user albums. The JSP pages also contain example output. Any framework tags could be used in this way to generate XML, which is demonstrated in the first JSP code. The second JSP code block using the custom tags which generates CSV output demonstrates that the framework is not limited to standard markup languages like HTML and XML.

```
album_list_xml.jsp:
<?xml version="1.0" ?>
<albums>
    <m:containers typeCode="album">
        <m:container>
            <album id="<m:containerProperty name="containerID"/>
                "title"="<m:containerProperty name="title"/>"/>
        </m:container>
    </m:containers>
</albums>
<!--
    example output:
    <?xml version="1.0" ?>
    <albums>
        <album id="1024" title="Vacations"/>
        <album id="3323" title="Family Trip"/>
        <album id="4932" title="Pets"/>
        <album id="6521" title="Laura's Wedding"/>
    </albums>
-->
album_list_csv.jsp:
<m:containers typeCode="album"><m:container>
"id", "title"
<m:containerProperty name='containerID'/>, "<m:containerProperty name='title'/>"
</m:container></m:containers>
<!--
    example output:
    "id","title"
    1024,"Vacations"
    3323,"Family Trip"
    4932,"Pets"
    6521,"Laura's Wedding"
-->
```

Appended herewith as Appendix A are source code listings in the Java programming language providing further description of the present invention. An appropriate Java development environment for compiling the source code listings is available from a variety of vendors, including Borland Software Corporation (formerly, Inprise Corporation) of Scotts Valley, Calif.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a computer system, an improved method for developing a Web application, the method comprising:
   providing a Web application development framework, said framework including an abstract command tag that predefines at least some generic Web application activities;
   specifying at least one custom action that is desired to be performed by a Web application;
   creating an object-oriented programming language (OOPL) class that extends the abstract command tag for providing execution logic for said at least one custom action, in addition to pre-existing logic that supports said at least some generic Web application activities, thereby creating a corresponding customized command tag that is capable of being embedded within a Web page;
   mapping a customized name of the customized command tag in a tag library descriptor file to the custom action;
   embedding the customized command tag with the customized name in a Web page of the Web application; and
   upon execution of the Web application including the embedded customized command tag in a Web page, invoking the customized command tag for conditionally executing said specified at least one custom action based on run-time conditions of the Web application and run-time values for one or more attributes included in the customized command tag.

2. The method of claim 1, wherein said run-time conditions include run-time parameters specified during invocation of the customized command tag.

3. The method of claim 2, wherein said run-time parameters are specified via Hypertext Transport Protocol (HTTP) parameters, during invocation of the customized command tag.

4. The method of claim 1, wherein said abstract command tag comprises an abstract base class.

5. The method of claim 1, wherein said abstract command tag includes an abstract execute method.

6. The method of claim 5, wherein said abstract execute method is overridden during creation of the customized command tag, for defining a customized execute method providing specific runtime execution logic for the customized command tag.

7. The method of claim 5, wherein creation of the OOPL class that extends the base class includes providing an implementation for the abstract execute method.

8. The method of claim 1, wherein said customized command tag includes an ability to conditionally affect application flow based on results obtained from a specified action.

9. The method of claim 8, wherein application flow is affected by routing to a particular Web page.

10. The method of claim 8, wherein said result obtained is either success or failure.

11. The method of claim 10, wherein application flow is directed to a first page if a success is obtained as the result, and is directed to a second page if a failure is obtained as the result.

12. The method of claim 8, wherein said application flow includes routing to a different page than is currently displayed in a user's browser.

13. The method of claim 1, wherein said generic Web application activities include error recording.

14. The method of claim 1, wherein said generic Web application activities include filtering of requests to match run-time attributes of the requests with the run-time values for the one or more attributes included in the customized command tag.

15. The method of claim 1, wherein said generic Web application activities include page routing.

16. The method of claim 1, wherein said generic Web application activities include activities that may be predefined before application execution.

17. The method of claim 1, wherein said customized command tag is invoked when an end user activates a link that points to a Web page containing the customized command tag.

18. The method of claim 17, wherein said link comprises a Uniform Resource Locator (URL).

19. The method of claim 17, wherein said Web page containing the customized command tag comprises a Web page generated using dynamic scripting capability.

20. The method of claim 1, further comprising:
compiling the Web page generated using dynamic scripting capability into a servlet, said servlet corresponding to said created OOPL class that extends the abstract command tag.

21. A computer-readable storage medium storing instructions for a Web application framework, which when executed by a computer system, causes the computer system to perform a method comprising:

specifying an abstract command tag that predefines at least some generic Web application activities;

providing a programming environment for:

(i) specifying at least one custom action that is desired to be performed by a Web application under development, by supporting creation of an object-oriented programming language (OOPL) class that extends the abstract command tag for providing execution logic for said at least one custom action, thereby creating a corresponding customized command tag that is capable of being embedded within a Web page, wherein a customized name of the customized command tag is mapped to the custom action in a tag library descriptor file, and wherein said customized command tag includes the ability to conditionally execute said specified at least one custom action based on run-time conditions; and (ii) enabling embedding of the customized command tag with the customized name in a Web page of the Web application;

embedding the customized command tag with the customized name in a Web page of the Web application; and wherein execution of the Web application includes invoking the customized command tag for conditionally executing said specified at least one custom action based on run-time conditions of the Web application and run-time values for one or more attributes included in the customized command tag.

22. The computer-readable storage medium of claim 21, wherein said run-time conditions include run-time parameters specified during invocation of the customized command tag.

23. The computer-readable storage medium of claim 22, wherein said run-time parameters are specified via Hypertext Transport Protocol (HTTP) parameters, during invocation of the customized command tag.

24. The computer-readable storage medium of claim 21, wherein said abstract command tag comprises an abstract base class.

25. The computer-readable storage medium of claim 21, wherein said abstract command tag includes an abstract execute method.

26. The computer-readable storage medium of claim 25, wherein said abstract execute method is overridden during creation of the customized command tag, for defining a customized execute method providing specific runtime execution logic for the customized command tag.

27. The computer-readable storage medium of claim 25, wherein creation of the OOPL class that extends the base class includes providing an implementation for the abstract execute method.

28. The computer-readable storage medium of claim 21, wherein said customized command tag includes an ability to conditionally affect application flow based on results obtained from a specified action.

29. The computer-readable storage medium of claim 28, wherein application flow is affected by routing to a particular Web page.

30. The framework of claim 28, wherein said result obtained is either success or failure.

31. The computer-readable storage medium of claim 30, wherein application flow is directed to a first page if a success is obtained as the result, and is directed to a second page if a failure is obtained as the result.

32. The computer-readable storage medium of claim 28, wherein said application flow includes routing to a different page than is currently displayed in a user's browser.

33. The computer-readable storage medium of claim 21, wherein said generic Web application activities include error recording.

34. The computer-readable storage medium of claim 21, wherein said generic Web application activities include filtering of requests to match run-time attributes of the requests with the run-time values for the one or more attributes included in the customized command tag.

35. The computer-readable storage medium of claim 21, wherein said generic Web application activities include page routing.

36. The computer-readable storage medium of claim 21, wherein said generic Web application activities include activities that may be predefined before application execution.

37. The computer-readable storage medium of claim 21, wherein said customized command tag is invoked when an end user activates a link that points to a Web page containing the customized command tag.

38. The computer-readable storage medium of claim 37, wherein said link comprises a Uniform Resource Locator (URL).

39. The computer-readable storage medium of claim 37, wherein said Web page containing the customized command tag comprises a Web page generated using dynamic scripting capability.

40. The computer-readable storage medium of claim 21, further comprising:
enabling a tag library descriptor that provides an association between a customized command tag and its corresponding OOPL class.

41. An improved method for Web application development, the method comprising:
providing a Web-based application development framework built from a set of object-oriented programming language (OOPL) classes, which extends an abstract command tag, said framework providing:
a non-programmatic tag framework that implements the functionality of the application framework when executing within a Web page using dynamic scripting capability;
tag-based Web application objects controlling program flow, executing user commands, representing application business objects, and constructing output;
a non-programmatic tag framework that maps customized tag names associated with customized command tags in a tag library descriptor file to corresponding custom actions, and accesses data for logical business objects and allows page designers to specify a custom tag name and an action to be performed;
enabling the embedding of the tag-based Web application objects with customized tag names in a Web page of a Web application; and
executing of the Web application including invoking the tag-based Web application objects for conditionally executing actions specified by page designers based on run-time conditions of the tag-based Web application and tag attributes in the tag-based Web application objects.

42. The method of claim 41, wherein said non-programmatic tag framework includes detecting and reporting error conditions to either a page developer or an end user running a Web browser.

43. The method of claim 41, wherein said set of OOPL classes run in an interpreter that interprets OOPL bytecodes into machine code.

44. The method of claim 43, wherein said interpreter is running at a Web server site.

45. The method of claim 41, wherein specified actions can be filtered by matching a tag attribute with an HTTP request parameter.

* * * * *